United States Patent [19]
Guest

[11] Patent Number: 4,645,246
[45] Date of Patent: Feb. 24, 1987

[54] TUBE COUPLERS

[76] Inventor: John D. Guest, "Iona", Cannon Hill Way, Bray, Maidenhead, Berkshire, United Kingdom

[21] Appl. No.: 844,921

[22] Filed: Mar. 27, 1986

[30] Foreign Application Priority Data

Mar. 28, 1985 [GB] United Kingdom ................ 8508121

[51] Int. Cl.⁴ ............................................ F16L 21/06

[52] U.S. Cl. .................................. 285/323; 285/307; 285/423; 285/351

[58] Field of Search ............... 285/323, 322, 307, 921, 285/423, 340, 351

[56] References Cited

U.S. PATENT DOCUMENTS

| | | | |
|---|---|---|---|
| 3,653,689 | 4/1972 | Sapy et al. | 285/323 X |
| 3,909,046 | 9/1975 | Legris | 285/323 X |
| 4,463,974 | 8/1984 | Ergun | 285/323 |
| 4,573,716 | 3/1986 | Guest | 285/323 |

FOREIGN PATENT DOCUMENTS

| | | | |
|---|---|---|---|
| 2501823 | 7/1975 | Fed. Rep. of Germany | 285/340 |

*Primary Examiner*—Richard J. Scanlan, Jr.
*Attorney, Agent, or Firm*—Jeffers, Irish & Hoffman

[57] ABSTRACT

The disclosure relates to a tap or valve body (10) having a bore (11) to receive a tube which is locked in the bore by means of a collet form tube coupling (21) and is sealed to the bore by O-ring seals 17, 18. The collet is encircled by a plastics insert sleeve (22) located in a counter-bore (19) at the end of bore 11 and held therein by a spring ring (39) embedded in the sleeve. The insert sleeve has a tapered bore (27) which converges towards the end of the tape or valve body and with which resilient fingers (32) of the collet engage to be compressed around the tube by the convergent bore to grip and hold the tube in the body.

5 Claims, 1 Drawing Figure

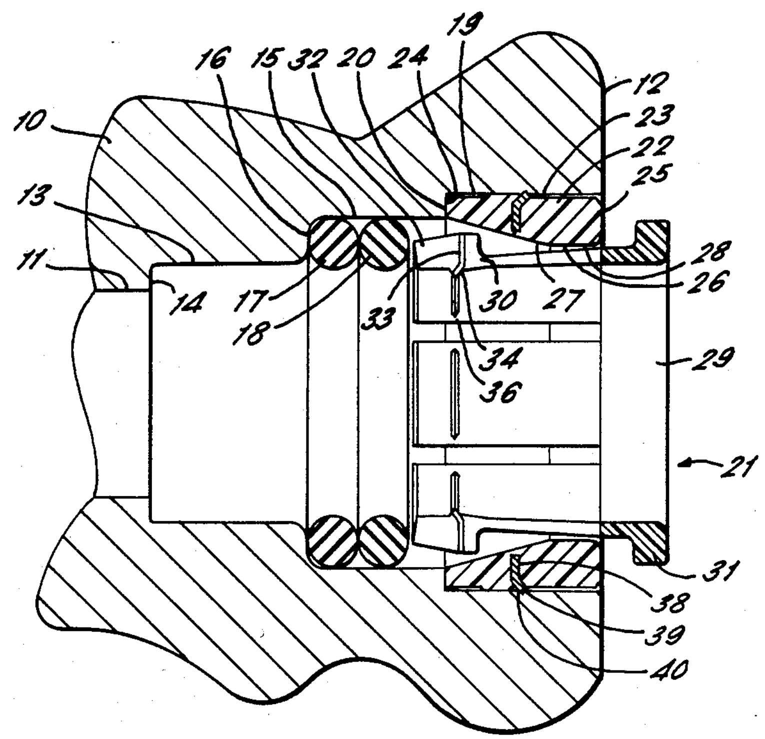
10
11
12
13
14
15
16
17
18
19
20
21
22
23
24
25
26
27
28
29
30
31
32
33
34
36
38
39
40

TUBE COUPLERS

BACKGROUND OF THE INVENTION

1. Field of the Invention

This invention relates to tube couplers and is particularly although not exclusively applicable to couplers for locking tubes in tap or valve bodies.

2. Background of Prior Art

U.S. Pat. No. 3,653,689 discloses a releasable coupling for a fluid carrying tube comprising a socket having stepped concentric bores, a collar having a conical surface retained in the first bore and a clamping member mounted for axial movement within the collar having a plurality of flexable jaws. The clamping member has an inclined surface to co-operate with the conical surface on the collar to force the jaws inwardly to clamp a tube received in the socket. The outer surface of the collar has a cylindrical guide portion for fitting into a socket in a further body and also has a conical portion which defines a sharp tooth-edged projection to engage and lock the collar in their socket in the body. The collar or cartridge is machined from solid metal and in order to provide the requisite gripping action in the body to withstand the high loads to which the fitting can be subjected, the outer surface of the collar and the conical projection must be machined to a very high degree of accuracy as must the diameter of the bore in the socket or the collar will not be adequately supported in the socket and the conical projection will not have the required degree of grip with the socket to hold the collar in the socket. If the collar has to be extracted from the socket for any reason, for example to enable seals in the collar to be replaced, the conical projection on the outer surface of the collar is almost certain to be damaged and will not provide adequate gripping engagement in the socket if it is re-inserted in the socket. Thus if the collar fails for any reason, it will almost certainly be necessary to replace the collar as well as any other failed component.

It is an object of this invention to provide a tube coupling in which the collar or sleeve can be manufactured without the need for highly accurate machining and which enables the sleeve to be extracted from the body in which it is housed as required and re-inserted without the risk of the gripping engagement of the sleeve in the body being significantly diminished.

SUMMARY OF THE INVENTION

The invention provides a tube coupler comprising a sleeve having a device therein to receive and grip a tube on the outer surface of the tube to lock releasably the tube in the sleeve, the outer surface of the sleeve having detent means thereon to permit the sleeve to be inserted in one direction into a bore in the throughway but resisting withdrawal of the sleeve from the throughway in the opposite direction by gripping engagement with the bore.

The detent means comprise an annular or part annular projection encircling the sleeve and angled along the sleeve in the direction in which resistance to withdrawal of the sleeve from the bore in the throughway is to be provided.

A ring is embedded in the wall of the sleeve and may have an outer peripheral part projecting from the outer surface of the sleeve and providing said annular projection on the sleeve.

More specifically the ring may comprise a flat annulus embedded in the body of the sleeve with an angled outer periphery projecting through the outer surface of the sleeve, the projection having an outer corner for bearing against the bore of the throughway in which the sleeve is to be inserted.

The sleeve may be formed from a moulded plastics material and the ring may be formed from a hard metal such as stainless steel.

BRIEF DESCRIPTION OF THE DRAWINGS

The following is a description of a specific embodiment of the invention, reference being made to the accompanying drawing which is a sectional view through a tap or valve body having a tube coupling at one end thereof.

DESCRIPTION OF THE PREFERRED EMBODIMENT

The drawing shows a tap or valve body 10 having abore 11 extending through the body from one end 12 of the body. The bore 11 is formed with a counter-bore 13 connected to the main bore 11 by an annular step 14 facing towards the open end 12 of the body to receive and end of a tube (not shown) to be coupled to the body. The counter-bore 13 gives way to a further counter-bore 15 by a step 16 again facing towards the open end 12 of the body in which two resilient O-ring seals 17, 18 are disposed side-by-side to one another to seal with the outer surface of the tube. The counter-bore 15 gives way to a still further counter-bore 19 by way of a step 20 again facing towards the open end of the body. The counter-bore 19 extends to the open end of the body. A tube coupling for locking the tube in the body is mounted in the counter-bore 19 and indicated generally at 21. The tube coupling comprises a moulded plastics sleeve 22 having an outer peripheral surface 23, one end 24 of which abuts the shoulder 20 and an opposite end 25 of which lies generally flush with the end 12 of the body 10 and an inner bore 26. The inner bore 26 is formed with an internal tapered cam surface 27 which converges from end 24 of the sleeve towards end 25 leaving a short length of plain cylindrical bore 28 adjacent end 25 of the sleeve. A moulded plastics collet 29 is mounted in the sleeve having a plurality of resilient fingers 30 projecting from the collet through the sleeve. At the outer end 25 of the sleeve, the collet projects outwardly from the sleeve and is formed with an outturned flange 31. Resilient arms 30 project from the other end of the sleeve and are formed with heads 32 to engage with the tapered cam surface 27 in the sleeve. The heads 32 of the sleeve are formed with an embedded metal insert 33 having an angled inner peripheral part 34 which projects at the inner surface of the heads to provide a sharply angled ridge 36 around the inner surface of each head to bear against and grip a tube located in the collet. When a tube is in position and the collet is drawn back to engage the head 32 with the cam 27, the action of the cam on the heads forces the ridges on the heads to bite into and lock the tube in the collet against extraction of the tube.

The sleeve 22 is held in the counter-bore 19 by an embedded metal ring 38 moulded into the wall of the sleeve and having an angled outer peripheral part 39 projecting from the outer surface of the sleeve towards the end 25 of the sleeve. The angled part 39 forms an outwardly facing sharp corner or ridge 40 to bite into the surface of the surrounding bore 19 of the valve body. The outer diameter of the sleeve 22 on the side of the projection 39 adjacent end 24 of the sleeve is increased slightly as compared with the other side of the projection to provide additional support to the projection. The outer diameter of the ridge 40 is chosen in relation to the diameter of the counter-bore 19 such that the ridge 40 is a tight interference fit in the bore. The angling of the projection towards end 25 of the sleeve permits the sleeve to be pressed into the counter-bore with accompanying deflection of the projection 39. However, if a force is then applied to extract the sleeve, the ridge 40 of the projection digs into the wall of the counter-bore and firmly locks the sleeve in position.

The forming of the sleeve from a moulded plastics material with the inserted retention ring formed in stainless steel enables considerable savings in expensive materials as compared with an all-metal stainless steel or brass sleeve.

I claim:

1. A tube coupler comprising a sleeve having means therein for receiving and gripping the outer surface of a tube to releasably lock the tube in the sleeve, the outer surface of the sleeve having detent means thereon to permit the sleeve to be inserted in one direction into a bore but resisting withdrawal of the sleeve from said bore in the opposite direction by gripping engagement of said sleeve with the wall of said bore, said detent means comprising a ring embedded in the wall of said sleeve, said ring having an outer peripheral part projecting outwardly from the outer surface of said sleeve, thereby forming an annular projection on the sleeve.

2. A tube coupler as claimed in claim 1 wherein the ring comprises a flat annulus embedded in the body of the sleeve with an angled outer periphery projecting through the outer surface of the sleeve, the projection having an outer corner for bearing against the wall of the bore in which the sleeve is to be inserted.

3. A coupler as claimed in claim 1 wherein the sleeve is formed from a moulded plastics material and the ring is formed from a hard metal.

4. A tube coupler as claimed in claim 1 in combination with a body having a bore forming a throughway, the bore having a first counter-bore at one end thereof for receiving and engaging the sleeve whereby the sleeve is locked in the end of the bore by said ring.

5. An assembly as claimed in claim 4 wherein a further counter-bore is provided in the bore next to the first counter-bore, at least one resilient seal disposed in said further counter-bore to provide a seal with the outer surface of a tube upon insertion of a tube in the bore in said body.

* * * * *